United States Patent [19]

Hirose et al.

[11] Patent Number: 4,608,488

[45] Date of Patent: Aug. 26, 1986

[54] DOCUMENT ISSUING APPARATUS

[75] Inventors: Nagayoshi Hirose, Tokyo; Sumiaki Kido, Yokohama; Yoshiharu Fuzita, Ebina, all of Japan

[73] Assignee: Tokyo Shibaura Denki Kabushiki Kaisha, Kawasaki, Japan

[21] Appl. No.: 523,051

[22] Filed: Aug. 15, 1983

[30] Foreign Application Priority Data

Aug. 24, 1982 [JP] Japan .................................. 57-146344

[51] Int. Cl.⁴ ............................................. G07B 15/02
[52] U.S. Cl. .................................. 235/384; 235/449; 340/721; 364/189
[58] Field of Search ............... 235/380, 381, 384, 432; 340/711, 721; 364/189

[56] References Cited

U.S. PATENT DOCUMENTS

| | | | |
|---|---|---|---|
| 3,803,634 | 4/1974 | Namikawa | 235/493 X |
| 3,812,461 | 5/1974 | Lemelson | 235/380 |
| 3,958,103 | 5/1976 | Oka et al. | 235/384 |
| 4,278,973 | 7/1981 | Hughes et al. | 340/721 |
| 4,370,550 | 1/1983 | Sidline | 235/380 X |

FOREIGN PATENT DOCUMENTS 55-49356 12/1980 Japan .
56-04949 2/1981 Japan .

OTHER PUBLICATIONS

TRS-80 Model III Disk System Owner's Manual: Tandy Corp., 1980, pp. 8,9,44,45.

*Primary Examiner*—David L. Trafton
*Attorney, Agent, or Firm*—Cushman, Darby and Cushman

[57] ABSTRACT

A previous ticket is read by a previous ticket reader unit, and the contents of read information are displayed on a CRT display unit, and are modified by departure/destination station information input sections and a condition input section. Thereupon, a new pass is issued by a printer/encoder unit in accordance with the modified information.

9 Claims, 17 Drawing Figures

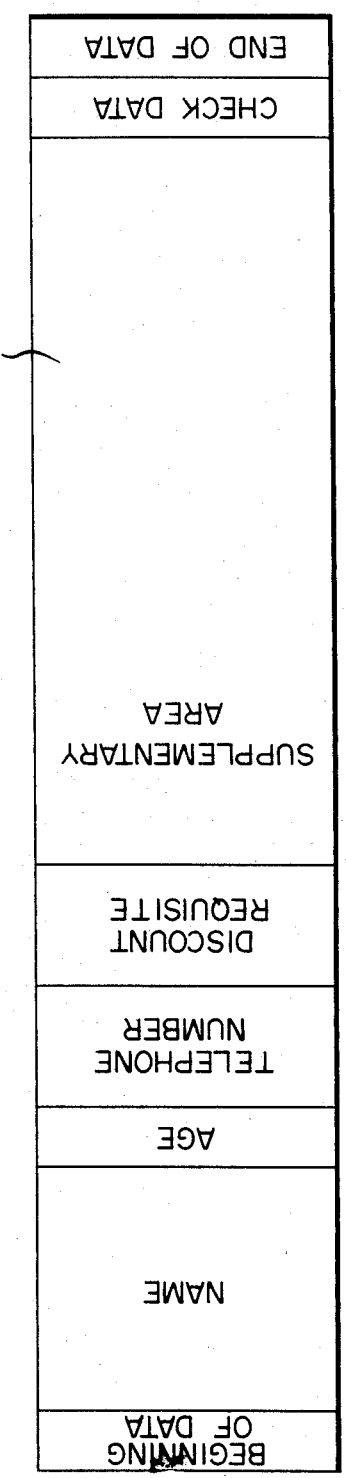
F I G. 7A
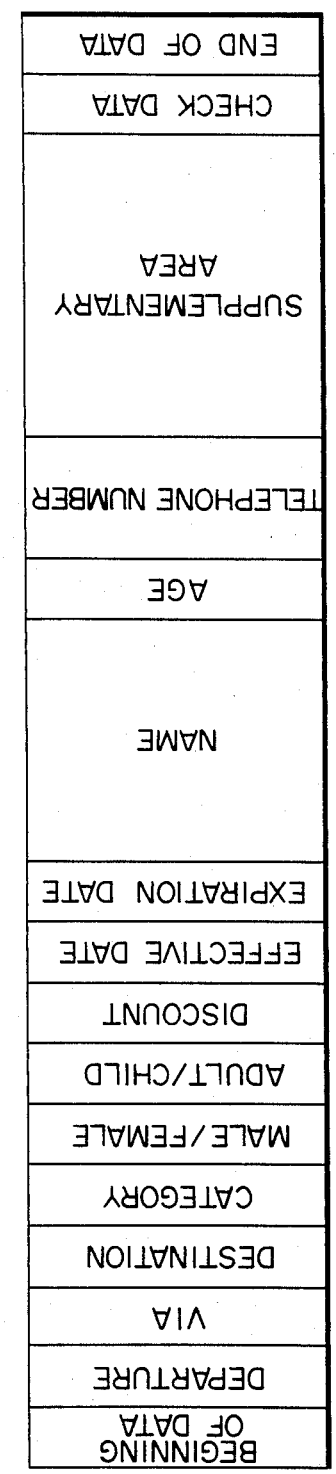
F I G. 7B

FIG. 11

TICKET NO. 1234    PREVIOUS TICKET    JUNE 25, 1982
                   EXPIRATION DATE

DEPARTURE : TOKYO    DESTINATION : KAWASAKI

VIA : TAMACHI

PASS INFORMATION : COMMUTOR  ADULT  MALE

NAME : TOSHIBA TARO    AGE : 20

✗ CONTENTS OF PASS

EFFECTIVE DURATION : ONE MONTH

EFFECTIVE DATE    : JUNE 26, 1982

EXPIRATION DATE   : JULY 25, 1982

AMOUNT : ¥4700

ISSUING DATE : JUNE 20, 1982

FIG. 12
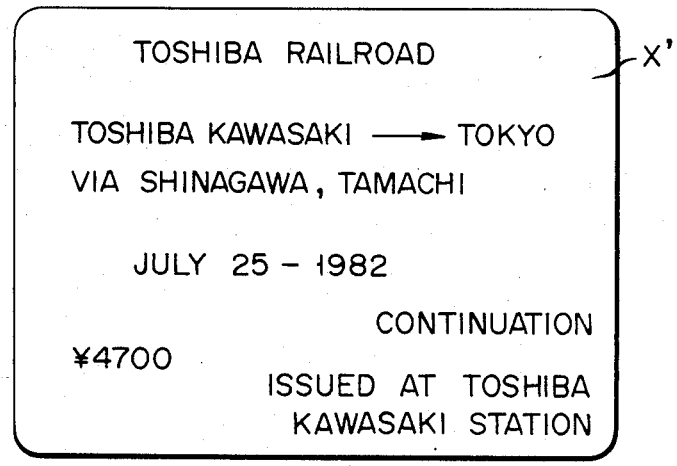

DOCUMENT ISSUING APPARATUS

BACKGROUND OF THE INVENTION

The present invention relates to a document issuing apparatus provided with a main control section which controls an information reading section for reading magnetic information on a previously issued document, and an issuing unit for issuing a new document in accordance with the information read by the reading section.

Some pass issuing machines, which are conventionally known as one of the document issuing apparatuses of this type, are provided with a magnetic information reading section for reading magnetic information from an expired pass in order to expedite the issuance of a continuation passes.

These machines are not, however, provided with any means for displaying the contents of read information. Therefore, an operator can neither check to see if the information is read correctly, nor identify errors in reading, if any. Thus, it would be impossible for the operator to change or modify the information.

SUMMARY OF THE INVENTION

The object of the present invention is to provide a document issuing apparatus permitting an operator to recognize the contents of information read from previously issued documents, and which is capable of speedy processing.

In order to attain the above object, a document issuing apparatus according to the invention comprises information reading means for reading information from a previously issued document, display means for displaying the information read by the information reading means, changing means for changing the information displayed on the display means to new information as required, and issuing means for issuing a new document in accordance with the new information.

BRIEF DESCRIPTION OF THE DRAWINGS

Other objects and features of the present invention will be apparent from the following description taken in connection with the accompanying drawings, in which:

FIGS. 7A and 7B are diagrams illustrating the encoded contents of purchase information on the pass shown in FIG. 6;

FIGS. 10A through 10C are schematic views showing still another example of the information reading section in the embodiment shown in FIG. 1, in which FIG. 10A is a plan view, FIG. 10B is a front view showing an uncovered state, and FIG. 10C is a side view;

FIG. 11 is a diagram showing an example of an indication on the frame of a CRT display unit used in the embodiment shown in FIG. 1;

FIG. 12 is a diagram illustrating the operation of the invention, whereby a departure station name and a destination station name are rearranged or exchanged on a pass.

DETAILED DESCRIPTION OF THE PREFERRED EMBODIMENT

Figure 1:
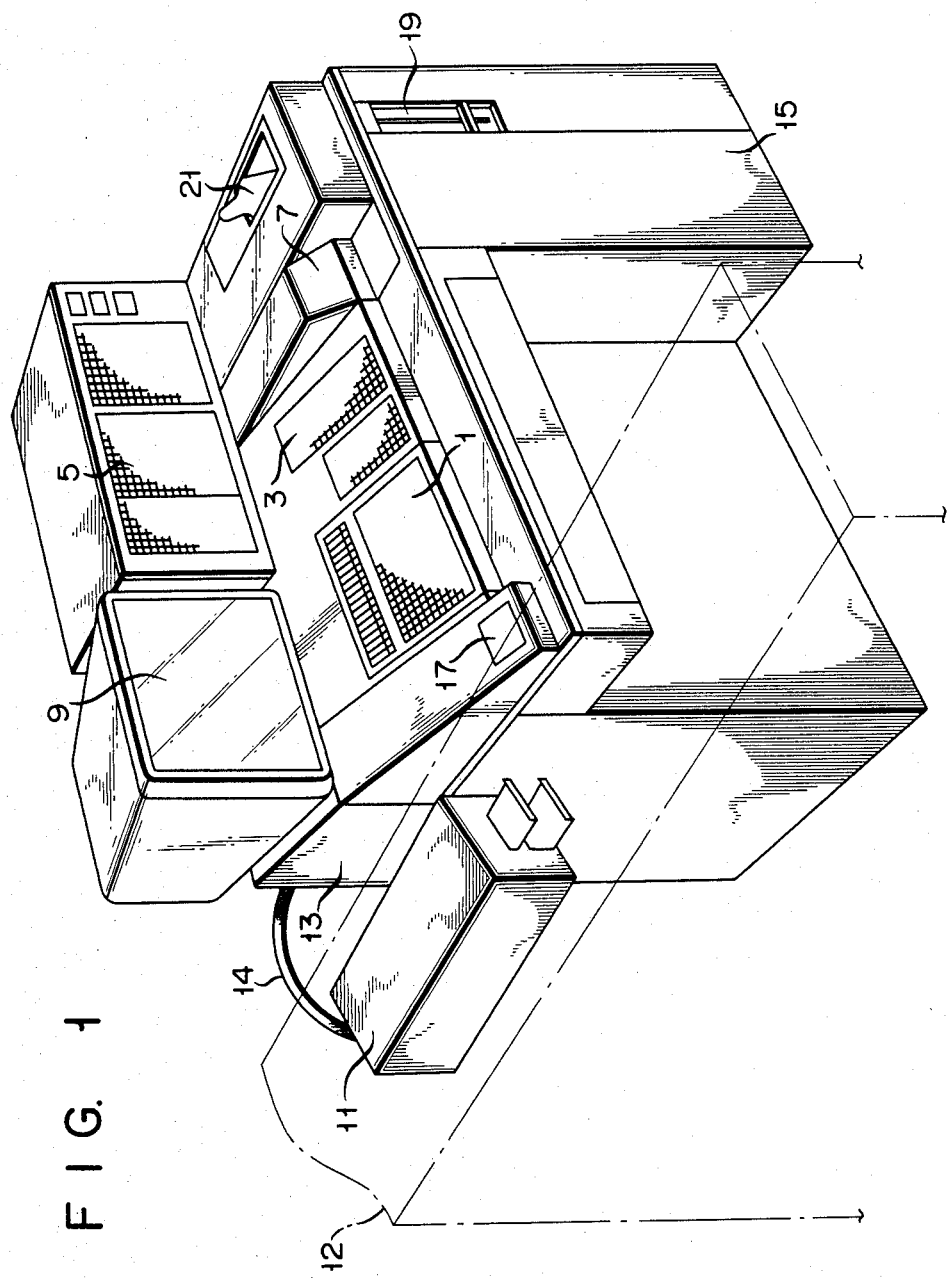
FIG. 1 is a perspective view of a pass issuing apparatus according to one embodiment of the invention.

One embodiment of this invention will now be described in detail with reference to the accompanying drawings. FIG. 1 is a schematic perspective view of a pass issuing apparatus according to the one embodiment of the invention. This apparatus comprises a first departure/destination station information input section 1 consisting of a key mat array of an auto touch-in type capable of an automatic paging operation and including departure/destination station name keys, way station name keys, katakana keys for inputting a commuter's name and the like, etc., a condition input section 3 including a ten-key board and others, a second departure/destination station information input section 5 capable of setting the names of departure and destination stations and way stations on internal lines which may require setting with high probability, a name transfer unit 7 for reading the name, age and other pattern information from an application for the issue of a pass and transferring them to a ticket blank, a CRT display unit 9 for indicating several pieces of information, expired pass reader unit 11 for reading magnetic information on an expired pass, a printer/encoder unit 13 (issuing unit) for printing a new pass and encoding magnetic information, a control unit 15 for controlling the individual sections, a new pass takeout section 17 attached to a panel surface, and a floppy disk 19 and a journal printer 21 for recording various transactions. The expired pass reader unit 11, the CRT display unit 9, and the second departure/destination station information input section 5 are each in the form of a unit, and can be attached to and detached from a main unit which incorporates all the other devices and sections. Electric power is applied from the main unit by means of a plug and the like. In particular, the expired pass reader unit 11 is in the form of an independent unit which is usually placed on a service counter 12, and can readily be attached to a conventional apparatus. Electrically connected to the main unit by means of a connecting cord 14, the expired pass reader unit 11 can easily be attached and detached according to specifications. Also, the expired pass inlet slot of the reader unit 11 can be directed to either a customer or a clerk in charge, thus enjoying improved versatility.

Figure 2:
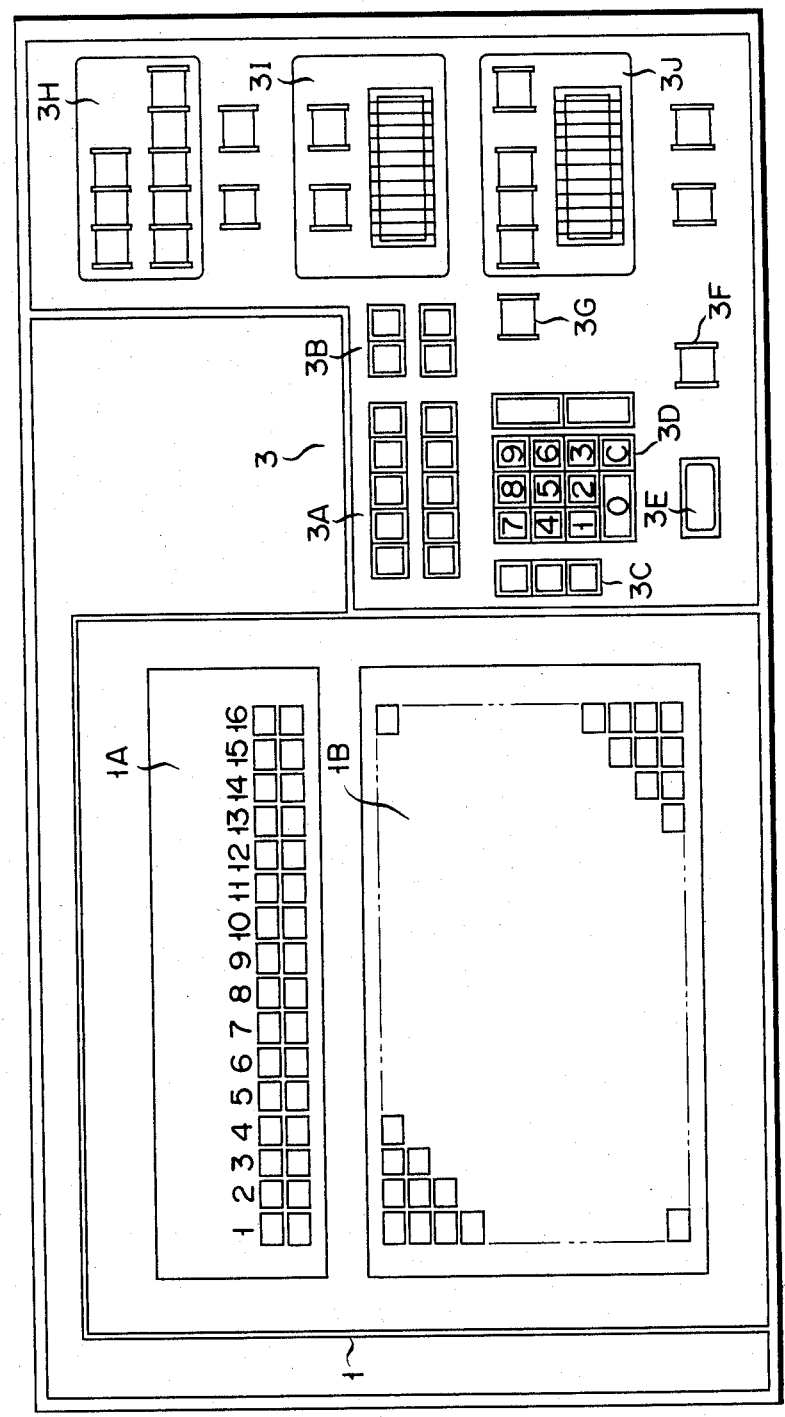
FIG. 2 shows an outline of a first departure/destination station information input section and a condition input section in the apparatus of FIG. 1.

Referring now to FIG. 2, the first departure/destination station information input section 1 and the condition input section 3 will be described in detail. The first departure/destination station information input section 1 is composed of selection buttons 1A for selecting the page of the key mat and a key mat array 1B including setting buttons (keys) for setting the names of stations, kana characters, alphabetic characters, etc. The names of stations on each route, kana characters, alphabetic characters, etc., of the key mat 1B are arranged in the form of a matrix. Thus, a key mat of the corresponding page appears in response to the selection of the selection buttons 1A. The condition input section 3 includes category buttons 3A, discount buttons 3B, effective duration buttons 3C, a ten-key board 3D, a start key 3E, a reset key 3F, a continuation key 3G, a refund operating section 3H, an expiration data adjusting section 3I, and an effective date setting section 3J.

Figure 3:
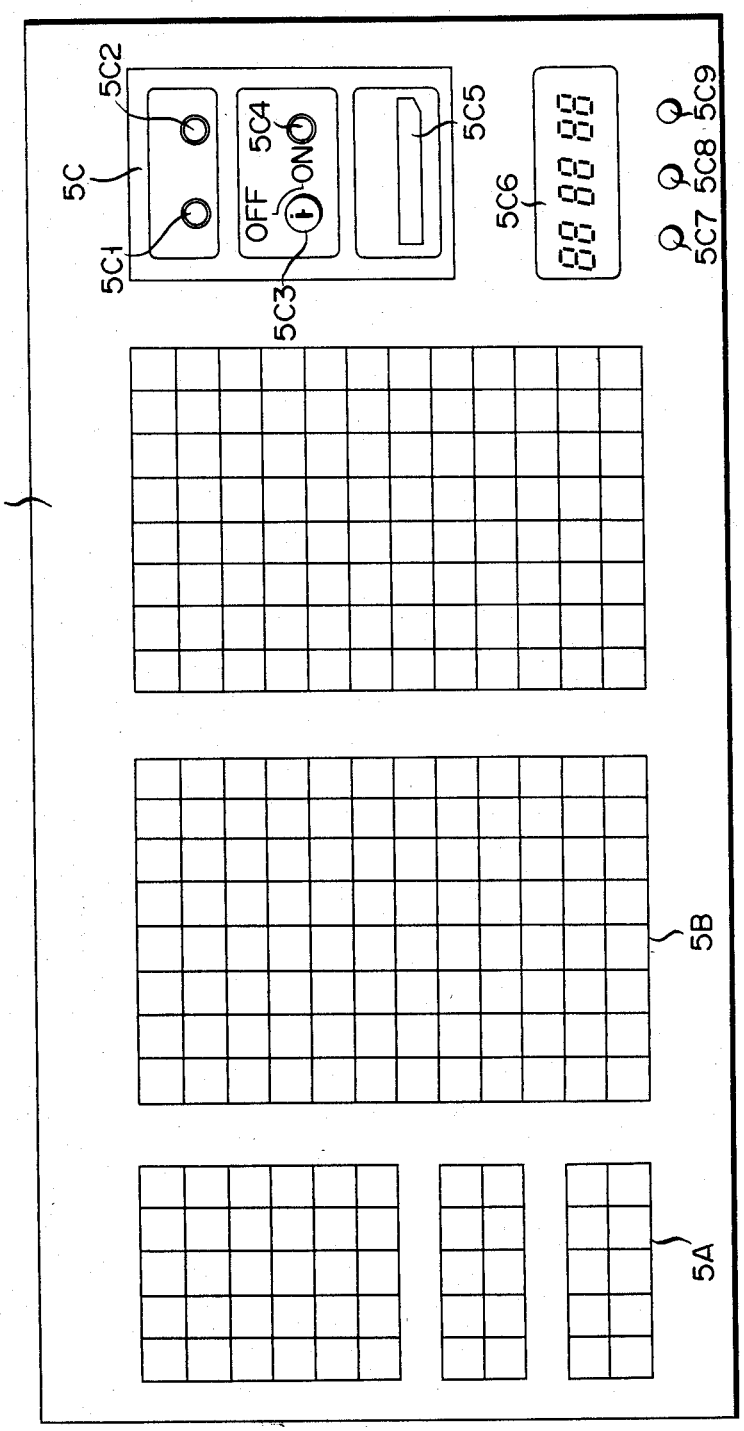
FIG. 3 shows an outline of a second departure/destination station information input section in the apparatus of FIG. 1.

As shown in FIG. 3, the second departure/destination station information input section 5 includes route buttons 5A, departure/destination station name setting buttons 5B consisting of departure station name buttons and destination station name buttons, and an operating section 5C having a power switch, an operator's ID plate inlet slot, and several indicators for operating instructions. In a connection route operation, the name of an external line is designated when an internal line is to be connected thereto. In a junction operation, the name of a specific station is designated when an internal line is connected to an external line thereat. In an internal route operation, the name of a station is designated when one internal line is connected to another thereat. The operating section 5C is formed of an in-operation indicating lamp 5C1, a stand-by indicating lamp 5C2, a power switch 5C3, a power switch-on indicating lamp 5C4, an operator's ID plate inlet section 5C5, an issuing data (Month, Date, Year) indicator 5C6, an adult's pass paper out indicating lamp 5C7, a child's pass paper out indicating lamp 5C8, and a journal printing paper out indicating lamp 5C9.

Figure 4:
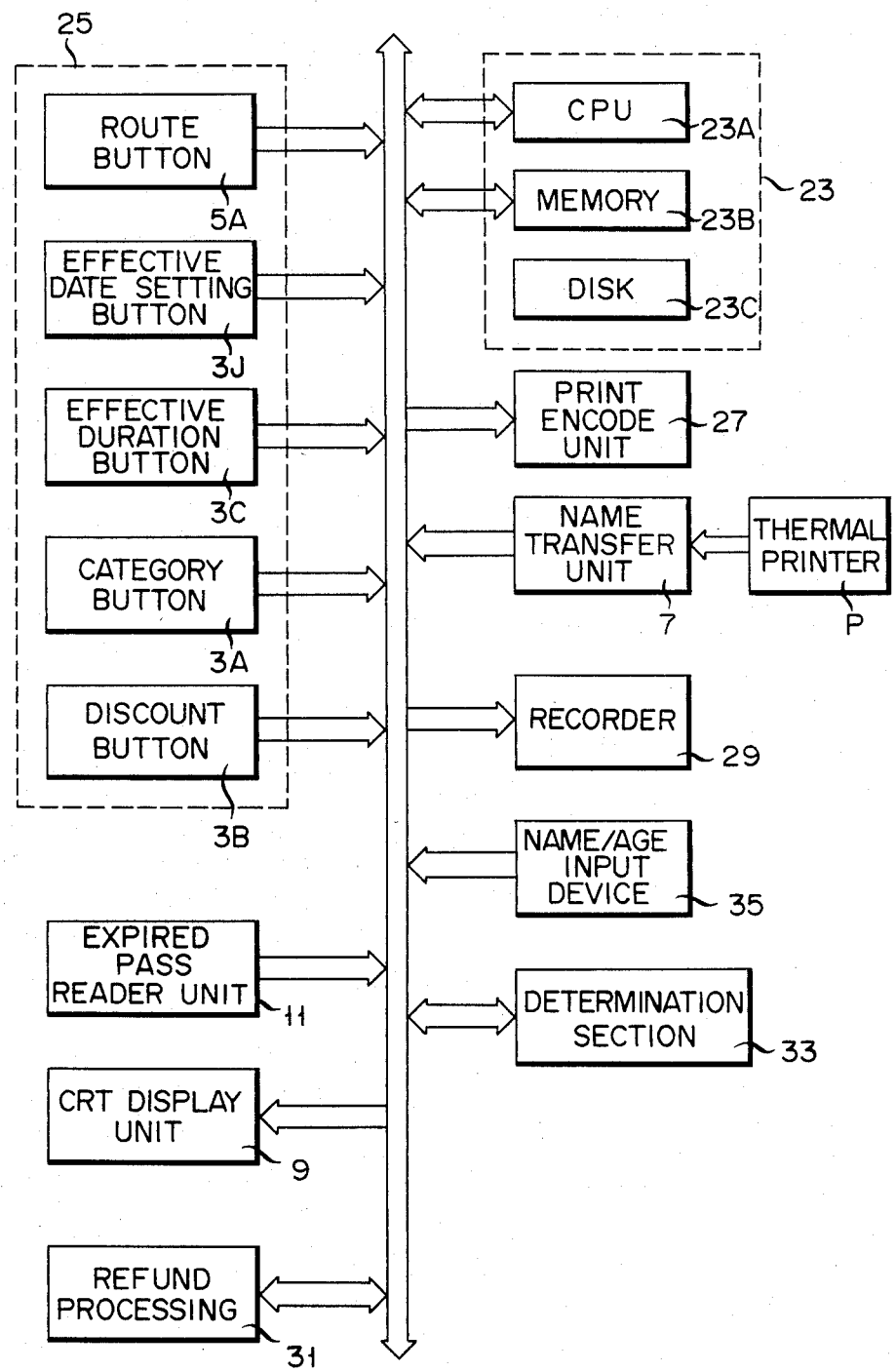
FIG. 4 is a block diagram of a control section in the apparatus of FIG. 1.

FIG. 4 is a control block diagram of the apparatus of the invention. A main control section 23 indicates a CPU 23A, a memory 23B, and a magnetic disk 23C storing station information, fare table information and other data. Besides the name transfer unit 7, the expired pass reader unit 11, and the CRT display unit 9, the following units are connected to the main control section 23. Among these units, an input section 25 comprises the aforementioned category buttons 3A, discount buttons, 3B, effective duration buttons 3C, effective date setting section 3J, and route buttons 5A. A printer/encoder unit 27 (issuing unit) performs pass printing and magnetic encode recording. A pass recoder 29 (including the floppy disk 19 and journal counter 21) records ticket sale data to review the data. Numerals 31 and 33 designate a refund processing section and a determination section, respectively, as described in detail later.

Figure 5:
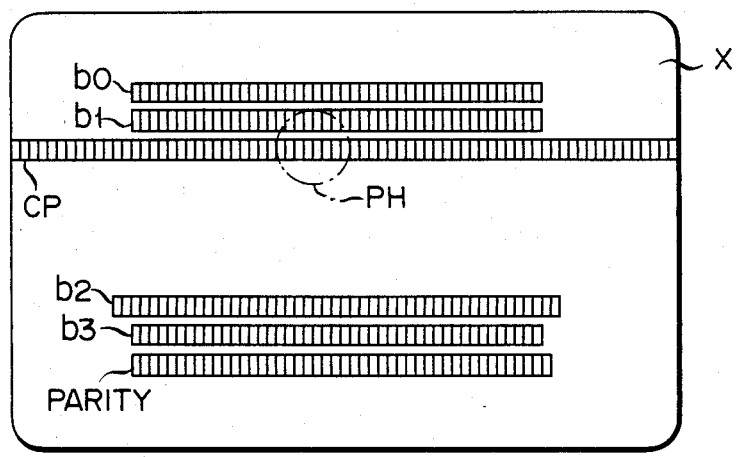
FIG. 5 is a bottom view of an example of a pass used in the embodiment shown in FIG. 1.
Figure 6:
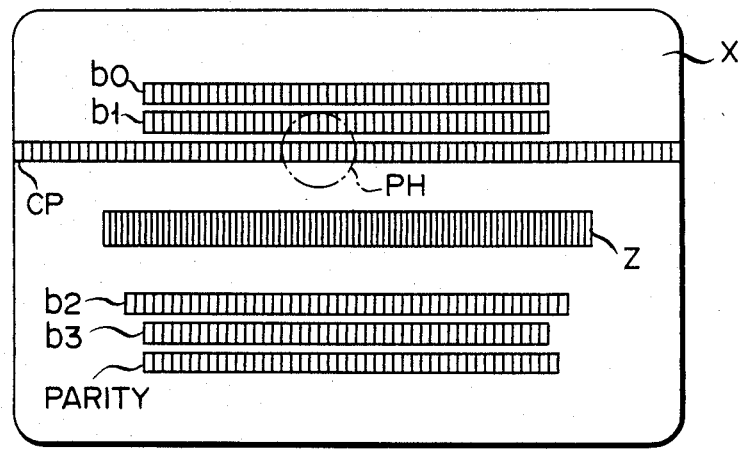
FIG. 6 is a bottom view of another example of the pass used in the embodiment shown in FIG. 1.

Referring now to FIGS. 5 through 7, there will be described the contents of magnetic information on a pass used with the apparatus of the invention.

In FIGS. 5 and 6, symbol X designates a pass on the back of which is recorded automatic ticket information formed of four bits b0, b1, b2 and b3 and a parity bit. Symbol PH designates a punch hole bored at the time of expired pass disposal.

Figure 8:
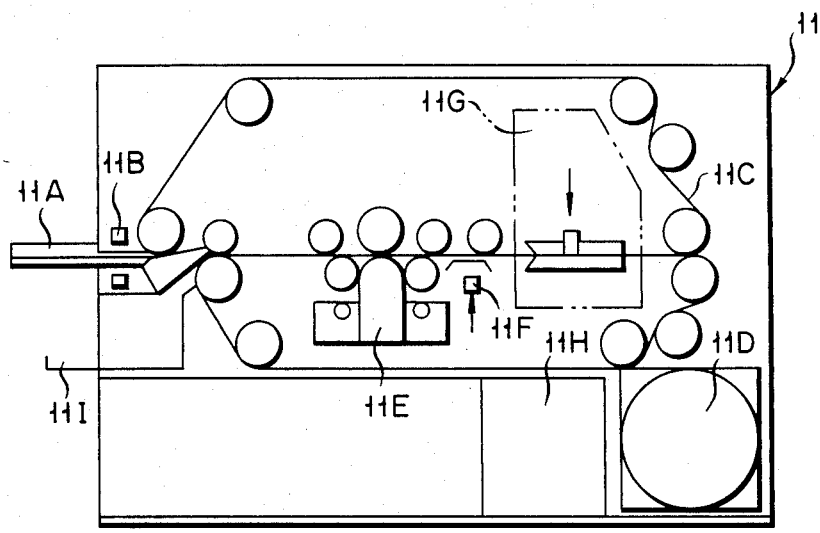
FIG. 8 is a schematic view showing an example of an information reading section in the embodiment shown in FIG. 1.
Figure 9:
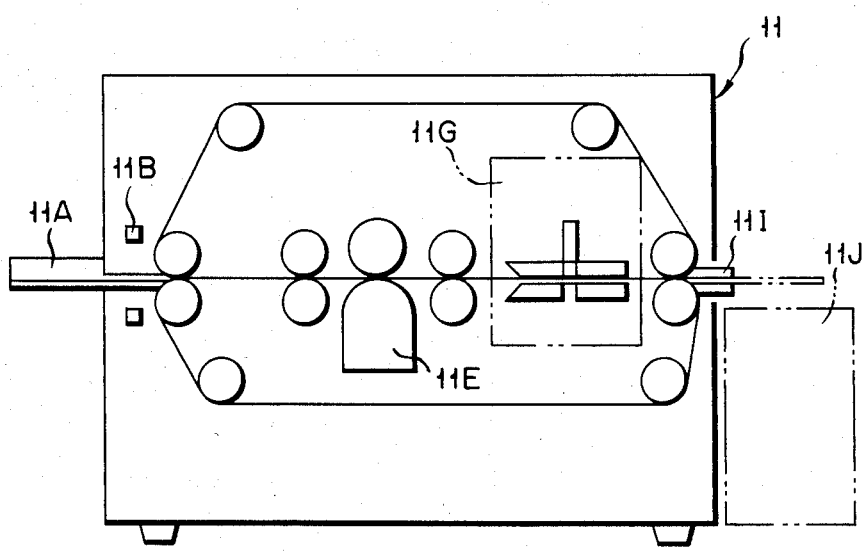
FIG. 9 is a schematic view showing another example of the information reading section in the embodiment shown in FIG. 1.
Figure 10A:
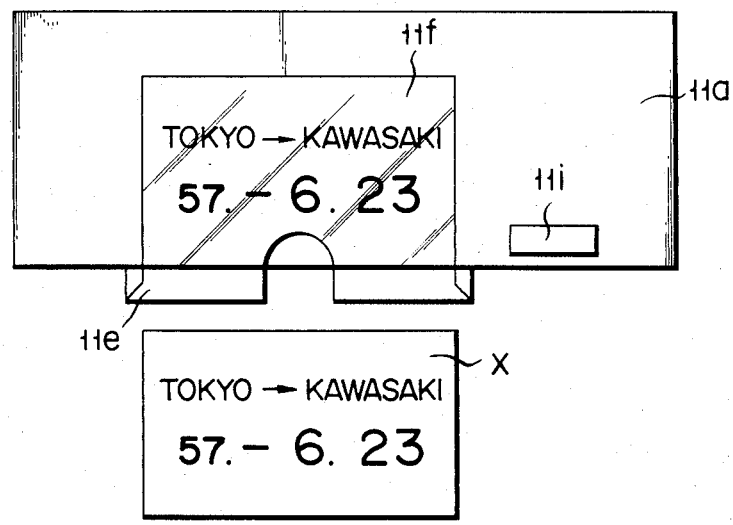
Figure 10B:
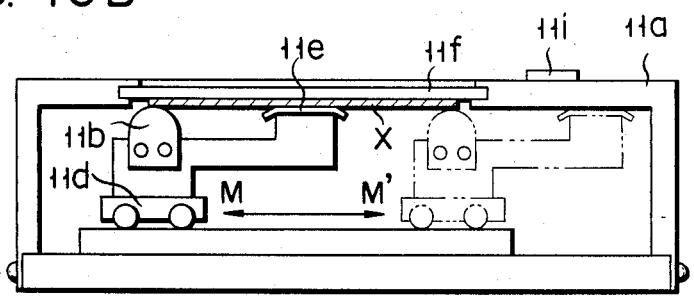
Figure 10C:
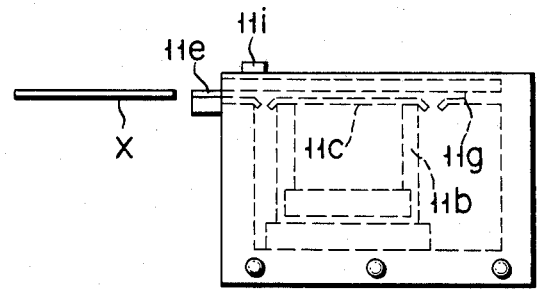

Referring now to FIGS. 8 through 10, the construction of the expired pass reader unit 11 will be described. The expired pass reader unit shown in FIG. 8 comprises an expired pass slot 11A, a pass insertion detector 11B, a conveyor system 11C consisting of rollers and belts, a conveyor motor 11D, a magnetic reading head 11E, a magnetic erasing magnet 11F, a punch mechanism 11G, a punch trash box 11H, and a pass outlet slot 11I provided under the pass inlet slot 11A. Unlike the one shown in FIG. 8, the expired pass reader unit 11 of FIG. 9 is not provided with the magnetic erasing magnet 11F, and is designed so that the pass outlet slot 11I is located horizontally opposite to the pass inlet slot 11A, and that an expired pass collecting box 11J is disposed under the pass oulet slot 11I. Unlike the ones shown in FIGS. 8 and 9, the expired pass reader unit 11 shown in FIGS. 10A through 10C is of a static read type. The reader unit 11 of this type is provided with a linear motor 11d which has a reading head 11b and a lower guide 11c inside a housing 11a. After the expired pass X is inserted between the lower guide 11c and an upper guide 11f of a pass inlet slot 11e at the upper portion of the housing 11a, the linear motor 11d is driven to move the reading head 11b. The upper guide 11f for guiding the pass inserted in the pass inlet slot 11e is made of transparent glass so that the clerk in charge can visually observe the pass from above. Numerals 11i and 11g designate a read start button and a stopper guide, respectively.

The principal functions of the main control section 23 will now be described. The main control section 23 is designed so that read information read by the expired pass reader unit 11 is indicated on the display section of the CRT display unit 9, as shown in FIG. 11. The displayed contents can be externally modified with ease. In changing the name, among other contents of display of FIG. 11, selection buttons for a katakana (name) key mat are selected out of the selection buttons 1A of the first departure/destination station information input section 1 so that the katakana key mat appears on the key mat array 1B. Thereupon, katakana keys representing the name are depressed to change the name. In changing the effective duration, the effective duration keys 3C are selectively depressed to automatically change the contents of display. Besides the aforementioned touch switch system, a cursor shift system may be adopted for partial modification, such as change of one character in the name. Flickering, increase of luminance or underline indication may be used to specify the stop of change. The change of contents is needed more frequently for newly issued defective passes than for an expired pass. In changing the contents of information on a newly issued pass, it is to be desired that the pass should be inserted into the expired pass reader unit 6 for the aforementioned processing.

The main control section 23 functions to perform the following processing through the exchange of signals with the determination section 33. The determination section 33 delivers a signal when it concludes at the time of expired pass information reading that the departure station does not belong to an internal line, but the destination station does. Receiving this signal, the main control section 23 delivers a control signal such that the departure station name on the expired pass is replaced with the name of a station on an internal line, and the printing positions for the names of way station(s) and the destination station are rearranged in the reverse order. This is done in order to verify the internal sale.

Now the operation of the aforementioned apparatus will be described. When an expired pass X is inserted into the pass inlet 11A of the expired pass reader unit 11, the pass insertion detector 11B is actuated to rotate the conveyor motor 11D in the forward direction. Thereupon, the expired pass X is taken into the apparatus so that the magnetic information on the expired pass X is read by the reading head 11E. The read information is fed to the main control section 23. Thus, a continuing purchaser can have his expired pass processed by the main control section 23 as the departure station, way station, category, discount, and male/female data are read, by only putting the expired pass into the expired pass reader unit 11. In consequence, it is unnecessary for the clerk in charge to input the individual pieces of information one by one through the input section 25.

After the expired pass is read by the expired pass reader unit 11, the operator sets an application blank in the name transfer unit 7, and designates an effective duration as required by means of buttons. (If the normal button setting condition is previously adjusted to, e.g., one month, then button designation is required only for three- and six-month durations, and the buttons need not be depressed for the designation of the one-month duration. The main control section 23 can calculate the expiration date of a new pass from the expiration date and effective duration of the expired pass). Then, the desired pass is issued when the operator depresses the start button. Thus, the operator's operations are greatly reduced in number, and the issuing time can be shortened. After the information of the expired pass is read by the expired pass reader unit 11, the conveyor motor 11D is reversed, so that the expired pass is returned to the pass oulet slot 11I. In the expired pass reader unit 11, the expired pass needs to be scrapped, to prevent it from being unfairly used after a continuation pass is issued by the use of the expired pass. (The expired pass must be made into an ineffective pass even after the continuation pass is issued, since the continuation pass can be sold a week before the actual expiration date of the old pass.) In this embodiment, when the pass is issued in accordance with the information read from the expired pass, the punch mechanism 11G (which, like a card puncher, consists of a solenoid and a punch pin, for example) is driven in response to a command from the main control section 23 to bore a punch hole PH in the pass (see FIGS. 5 and 6). After the mark indicating the expiration of a term is put on the pass in this manner, the conveyor motor 11D is reversed to the pass can be returned to the pass outlet slot 11J. As the conveyor motor 11D is reversed to return the pass, the magnetic erasing magnet 11F is pressed against the magnetic surface of the pass to erase all the magnetic information on the pass so that the pass cannot be used in an automatic ticket apparatus. In executing these processes of operation, it is to be desired that the expired pass should be held at a pass scrapping section after reading so that it is scrapped after a new pass issue end signal (print/encode end signal) is detected. This should be done in order that the expired pass may be reinserted into the apparatus in case of wrong setting, cancel or issue errors after the expired pass reading.

Naturally, the expired pass reader unit 11 may be built in the pass issuing apparatus. In this embodiment, however, it is designed as an independent unit separate from the main unit of the issuing apparatus, and is placed on a table or the like at the service counter. The expired pass reader unit 11 is electrically connected to the main unit by means of a cable. In this case, an apparatus shown in FIG. 9 is set so that the pass inlet slot 11A faces the purchaser's side at the pass window. Thus, a purchaser can insert his expired pass himself, and the operator's operations are further reduced. Also, it is possible to automatically collect the expired pass in the expired pass collecting box 11J without holding them at the pass outlet slot 11I. In this case, the expired pass collecting box 11J can be built in the expired pass reader unit 11. In case of reading errors, the expired pass may be returned to the pass inlet slot 11A for referring. Alternatively, the operator may put it into the apparatus through the pass outlet slot 11I for rereading after it is delivered to the operator side (pass outlet slot 11I) for the operator's check. Thus, the expired pass reading section can be provided both for operator's use and for purchanser's use, since it is an independent unit separate from the main unit.

In the issue of the continuation pass, as described above, the expired pass reading functions is used as a very effective input means. In the conventional method of continuation pass issue, however, a new pass is issued to the owner of a pass approaching its expiration day, and a mark "continuation" is printed on the newly issued pass. The effective duration of the new pass is set to n months (n=1, 3 or 6) from the day following the expiration day of the expired pass. A purchaser possessed of an expired pass is regarded as a new purchaser.

Figure 13:
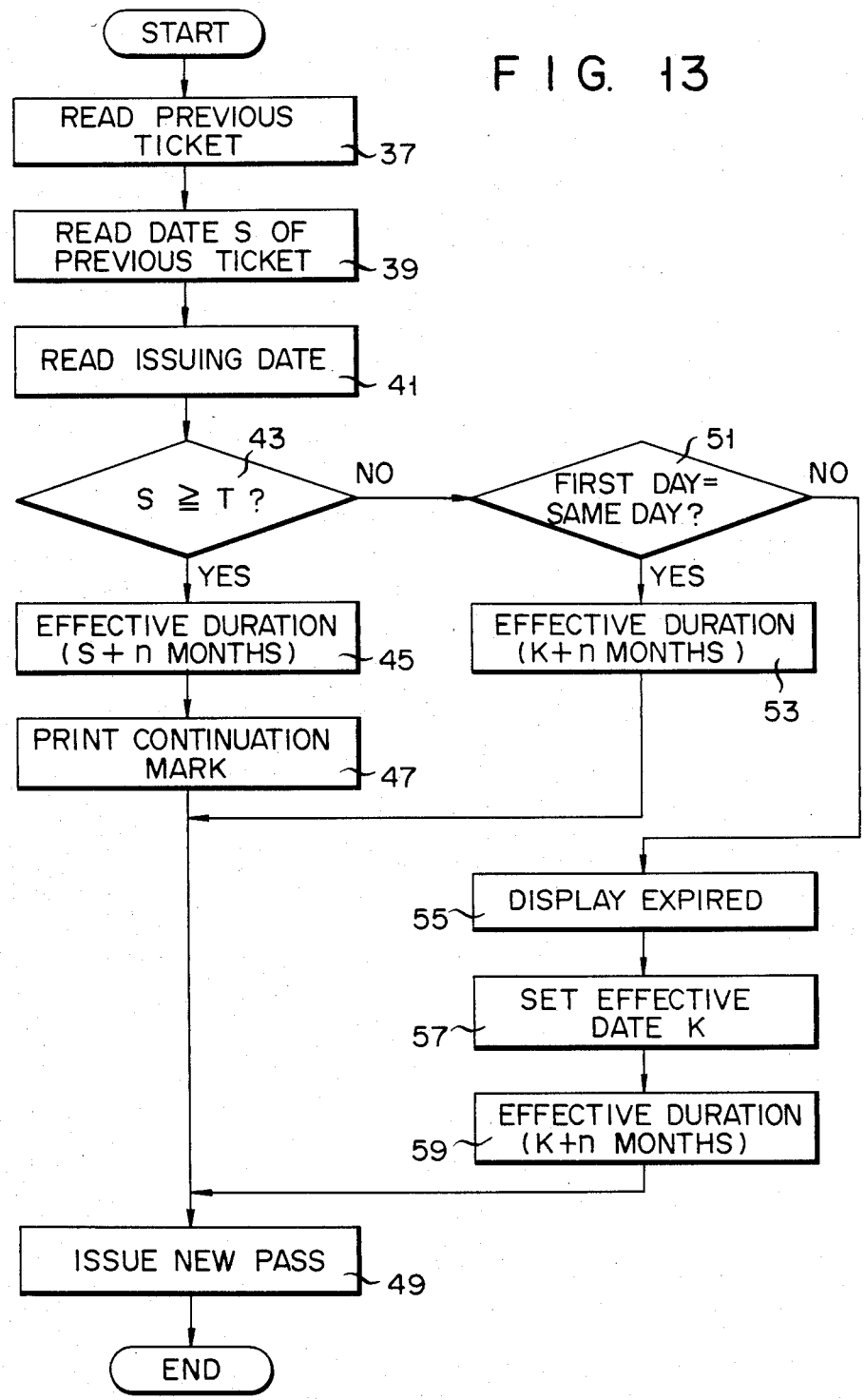
FIGS. 13 and 14 are flowcharts for illustrating the operation of the invention, FIG. 13 showing the case in which purchase information is included in the magnetic information on an expired pass X, and FIG. 14 showing the case in which no purchase information is included in the magnetic information.

In the issuing method using the expired pass reader unit 11, on the other hand, the reader unit 11 is used as input means for pass information. If the purchaser has an expired pass, then the expired pass is read by the expired pass reader unit 11 without regard to its expiration date. Thus, a pass can be issued according to the following processing steps, as shown in the flow chart of FIG. 13. Since the issuing date needs to be printed on the pass, the pass issuing apparatus is always provided with a switch (not shown) for setting the issuing date. Hereupon, the issuing date (date of purchase) is given by T. The expired pass is read in step 37, and the expiration date S of the expired pass is read in step 39. The issuing date is read in step 41, and then, in step 43, a decision is given on whether or not S is $S \geq T$. If $S \geq T$, then the effective date of the issuing pass is not reached yet. Thereupon, in step 45, the effective duration of the pass is set so that the pass is available for n months (n=1, 3 or 6) from the day following the date S. The mark "continuation" is printed in step 47, and the new pass is issued in step 49.

If $S < T$ is determined in step 43, on the other hand, then a decision is given in step 49 on whether or not the first day K of the term is the day of issue. If the first day K is the day of issue, the effective duration is set to n months from the day K in step 53, and the new pass is issued in step 49. If the first day K is not the day of issue, the message "new" or "expired" is displayed to the operator in step 55. Then, the operator sets the first day or effective date K in step 59, and the effective duration is set to n months (n=1, 3 or 6) from the day K in step 59. Then, the pass is issued as a new one in step 49. In these operations, the main control section performs automatic determination. Thus, the expired pass can effectively be used as the input means for the issue of continuation or newly started passes.

Various methods are proposed for automatically selling current passes (continuation passes). Among these is a method in which those data, among the data required for the pass issue, which are not included in the purchase data are previously recorded on the blank space of the magnetic surface so that a ticket is printed and automatically sold in accordance with information all of which is read from an expired pass put in the apparatus.

In this case, the contents of a magnetic encode format as shown in FIG. 6 are recorded as the purchase information Z on the blank space of the magnetic surface, as shown in FIGS. 7A and 7B. That is, as shown in FIG.

7A, the name, age, telephone number, discount requisite are recorded and as shown in FIG. 7B, the departure station name, via station name, destination station name, category, sex (male/female), class (adult/child), discount condition, effective date, expiration date, name, age and telephone number are recorded. Thus, all the information required for the calculation of fare and pass printing can be obtained from the pass. It is to be understood that the present invention is not limited to vending machines, and can also be applied to an ordinary pass issuing apparatus. As shown in FIG. 4, the pass issuing apparatus is additionally provided with a name/age input device 35 (consisting of push buttons or block buttons). In issuing a new pass, the input device 35 is used for the input of name and age, recording of the purchase information Z, and encode recording based on the contents shown in FIG. 6. In inputting the name, a character pattern may be read and printed in accordance with input information, or the name written in an application is imaged and transferred by the name transfer unit 7.

Thus, in issuing the continuation pass by the pass issuing apparatus using the expired pass with the purchase information recorded thereon, the following various steps of processing may be executed. In this case, the expired pass reader unit 11 is expected to read the purchase information. Thereupon, it is necessary only that the reading head 11E be provided with a purchase information reading winding and an amplifier circuit. Since the name and age are obtained first, it is unnecessary to transfer the name from the application. Thus, a continuation purchase need not file the application. If the application is omitted, therefore, it is necessary to prepare some memorandum. The pass issuing apparatus is provided with the journal printer 21. According to the present invention, therefore, the journal printer 21 is used to print out the pass number, amount, name, age as required, telephone number, section, issuing date, etc., on the issued pass, thereby preparing a memorandum. If the issuing apparatus is not provided with the printer or if the printer cannot be used, then the pass number of the new pass is printed on the expired pass to keep it as memorandum. The name, age, section, etc. need not be printed then, since they are already printed on the expired pass. If necessary, however, the amount, telephone number, and issuing date may be printed. In this case, a dot printer is provided in place of the punch mechanism 11G of the expired pass reader unit 11, and printing is controlled by the main control section 23. Alternatively, the punch mechanism may be left. In this case, the conveyor path is extended to accomodate a printing mechanism (not shown). By doing this, a pass can be issued by a series of operations including expired pass insertion, effective duration setting, and depression of the start button. Thus, the issuing time can greatly be shortened.

Figure 14:
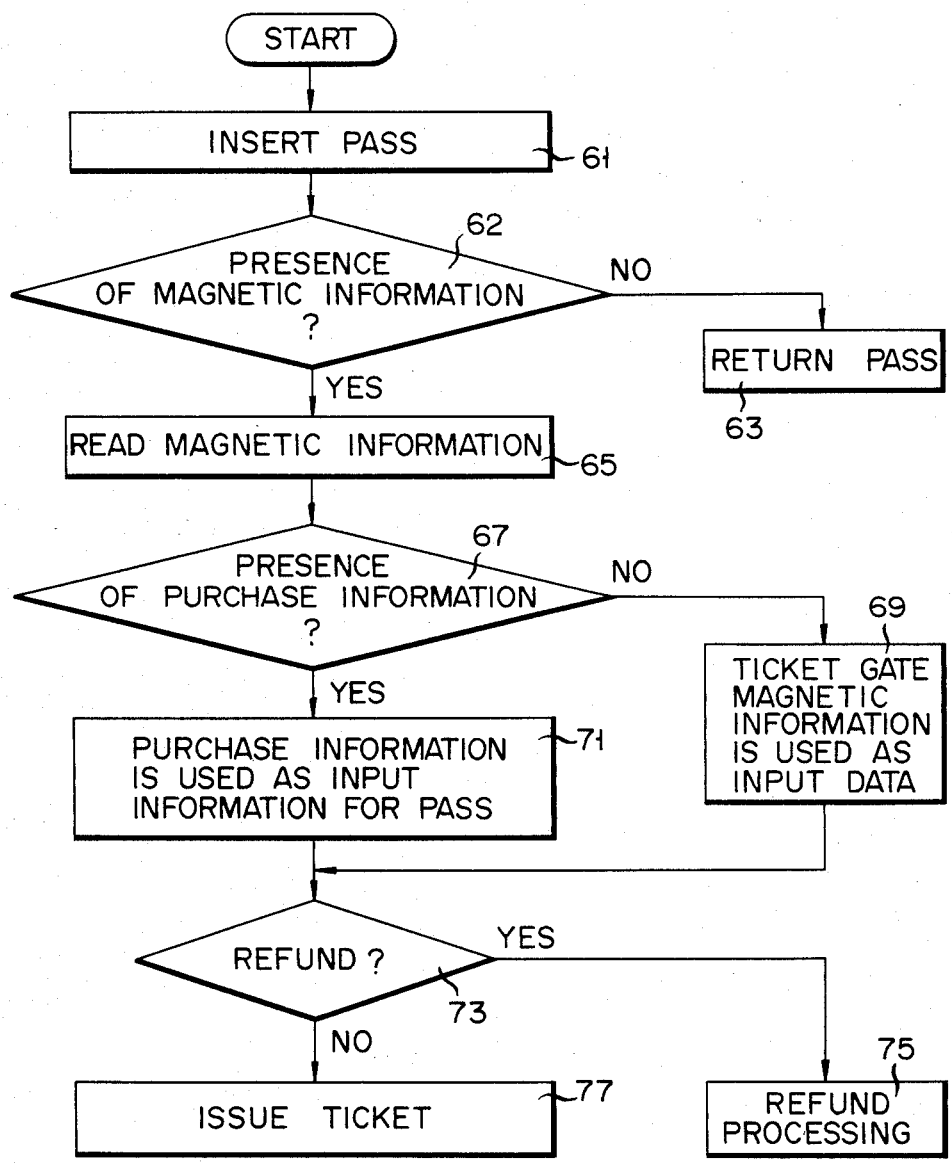

If the issuing apparatus is designed so that the purchase information Z as shown in FIG. 6 can be processed, it is necessary that passes be issued even in the middle of replenishment of the apparatus and for external lines. Thus, the pass issuing apparatus is expected to receive the passes without respect to the presence of the purchase information therein. The determination section 33, which is newly provided by the present invention, identifies the read information read by the expired pass reader unit 11. It also determines whether or not the read information is the purchase information mentioned later, or whether or not the purchase information can correctly be read, and signals to indicate the result of the judgment. Receiving this signal, the main control section 23 usually reads the purchase information, out of the magnetic information on the pass, as input information. If the purchase information cannot be read or if it is not encoded, then the input information is automatically read from the magnetic information for the automatic ticket machine. In this embodiment, passes containing the purchase information (FIG. 6) are issued without the name transfer from the application. In issuing passes without the purchase information (FIG. 5), on the other hand, the operator is informed of the absence of the purchase information through a CRT or other display means (not shown), and then inputs the name and age by means of the name/age input device 35. Thus, the expired pass can be used as input means for pass information without regard to the presence of the purchase information. In the absence of the purchase information, the operator may set the application in the name transfer unit to transfer the name and age on the application, instead of inputting them. Alternatively, if the absence of the purchase information is detected in step 67 of the flow chart of FIG. 14, magnetic information for the automatic ticket machine may be read out of the magnetic information on the expired pass by the main control section to be used as input data in step 69, for the issue of the new pass. Further, the use of the expired pass reader unit 11 enables the following processing. In refunding operation for a pass, as in the issue of the continuation pass described above, the amount of refund is calculated by inputting data on the refund pass, such as the effective date, expiration date, departure station name, destination station name, way station name, category, discount condition, etc., by means of the buttons of the issuing apparatus. Also in the refunding operation, therefore, the necessity of inputting the aforesaid data is obviated by reading the refund pass by means of the expired pass reader unit 11. Thus, the amount of refund may be calculated by the main control section 23 and displayed to the operator if the operator only designates one of refund condition buttons (amount, payment per month, payment per ten days, payment per day, ordinary payment, etc., not shown). In this case, even though no purchase information is included in the magnetic information on the expired pass X, as shown in the flow chart of FIG. 14, the magnetic information for the automatic ticket machine can be used as refund information.

When the expired pass is read by the expired pass reader unit 11 of the pass issuing machine, however, the operator can neither check to see if the information is read correctly, nor identify reading errors, if any. This awkward problem is solved by providing the pass issuing apparatus with the CRT display unit 9 so that the read information is indicated thereon as shown in FIG. 11. As the read information is displayed in this manner, the operator can attend on the purchaser while watching the CRT display unit 9. In case of expiration or some other critical situation, therefore, it is unnecessary to take out the pass in expired pass reader unit 11 for checking. If a purchaser possessed of an expired pass changes the section, or if a new pass is issued with a wrong section, category and/or effective duration thereon, then the pass is inserted into the expired pass reader unit 11 to be read thereby, and indicated on the CRT display unit 9. Thus, only the item(s) in question can be modified by reinputting through the input section 25, designation of CRT cursor shift, or inputting of the item(s) through a touch CRT. In processing the purchase information Z of FIG. 6, recording, in particular, the pass inserted in the expired pass reader unit 11 can serve as a very effective means for modifying and identifying the name and age. In the conventional issuing apparatus, the input buttons of the input section 25 are of an illumination type such that the operator can notice the contents of information corresponding to the depressed button. When using the CRT display unit 9, however, all the input data are displayed on the CRT visual check, so that the necessity of the illuminated buttons is obviated. Further, the CRT display unit 9 can be substituted for all other indicators for the display of amount, trouble, operating instructions, etc. In modifying the input information from the expired pass with use of the CRT display unit 9, moreover, the item(s) to be modified may be indicated with varied luminance or in a flicker display mode so that the operator can easily notice the contents of modification on the display.

A purchaser of a continuation pass does not always buy it at one and the same station (entraining or alighting station). If the entraining and alighting stations are on lines of different companies, the name of the station at which the purchaser buys the pass is generally recorded as the departure station name on the ticket to be issued. Namely, if the pass is purchased at a station A' of a company A, then it carries a description "A'-B'" where B' is a station of a company B. If the pass is purchased at the station B', then it bears a description "B'-A'". According to the present embodiment, the following processing may be performed under these circumstances. In reading the magnetic information on the expired pass, station codes for the departure and destination stations are checked. If the departure station is on an internal line, that is, on a line of the pass issuing company, then the pass or pass is issued without any modification. If the departure station is on an external line or a line of any other company, then the names of the departure and destination stations are printed in replaced positions on the pass. Also, the names of way stations are rearranged in a reverse order. FIG. 12 shows an example of such rearrangement. In FIG. 12, the expired pass X is issued by the company A. In issuing a continuation pass X' based on the expired pass X at a station of the company B, the departure station is regarded as a station on an external line, and the names of the departure and destination stations, as well as of the way stations, are rearranged in a reverse order. Thus, the pass X' is issued as a pass from the company B.

Although the issuing method using the expired pass reader unit 11 of a pass conveyor type as shown in FIGS. 8 or 9 have been described above, the reader of a static read type as shown in FIG. 10 may also be used for the expired pass reader unit 11. In the reader unit 11 of FIG. 10, the expired pass X is read by moving the recording head without transferring the pass. Accordingly, the operator can see the printed contents of information on the expired pass X inserted in the expired pass reader unit 11. Thus, the expired pass reader unit 11 is compact and easy to operate. The expired pass X is inserted into the pass inlet slot 11e by the operator, and is forced deep into the unit along the upper and lower guides 11f and 11c until it engages the stopper guide 11g. After the insertion, the read start button 11i is depressed so that the main control section 23 drives the motor 11d from a position M to a position M'. In the present embodiment, a linear motor is used for the motor 11d, and the reading head 11b and the lower guide 11c are fixed to the working part of the motor 11d. As the motor 11d is transferred from the position M to the position M', therefore, the reading head 11b moves from the position M to the position M' to read the magnetic information on the expired pass X. After the reading, the reading head 11b is returned to the original position M. The linear motor 11d can be easily controlled in its forward-/reverse rotation and start/stop operation, enjoying high transfer stability and compact design. Since the upper guide 11f is made of a transparent material, the operator can read the data printed on the expired pass X being inserted. Accordingly, the operator can readily check the contents of the data and cope with reading errors and the like. The reading head drive system is not limited to the linear motor, and various changes and modifications may be effected therein. Although a pass issuing apparatus has been described herein in connection with the above embodiment, the present invention is not limited to such embodiment, and may also be applied to issuing apparatuses for fixed deposit certificates, stock certificates and other securities, licenses, identification cards, etc.

What is claimed is:

1. A commutation pass issuing apparatus comprising:
information reading means for reading information on a previously-issued commutation pass;
display means for displaying, from among the read-out information, every item necessary for issuing a new commutation pass;
changing means for changing those of the displayed items determined to need modification;
issuing means for issuing a new commutation pass in accordance with the changed items; and
control means for checking codes of the departure and destination stations printed in the previously-issued pass and controlling said changing means and issuing means in such a manner that a new pass is issued without any modification when the departure station is on the line of the pass issuing company and a new pass is issued with the names of the departure, destination and way stations printed in the reverse order.

2. The commutation pass issuing apparatus according to claim 1, wherein said changing means is any one of a touch switch means and cursor shift means.

3. The commutation pass issuing apparatus according to claim 1, wherein said display means displays item portions changed by said changing means in a display mode different from that for the other item portions.

4. The commutation pass issuing apparatus according to claim 3, wherein said display mode is a flicker display mode.

5. The commutation pass issuing apparatus according to claim 3, wherein said display mode is a mode such that luminance is increased.

6. The commutation pass issuing apparatus according to claim 3, wherein said display mode is an underline display mode.

7. The commutation pass issuing apparatus according to claim 1, wherein the document read by said information reading means is a mistakenly issued commutation pass.

8. The commutation pass issuing apparatus according to claim 1, wherein said commutation pass read by said information reading means is an expired commutation pass, and the commutation pass issued by said issuing means is a newly effectuated commutation pass.

9. The commutation pass issuing apparatus according to claim 1, wherein the commutation pass read by said information reading means is a commutation pass expiring in a few days, and the commutation pass issued by said issuing means is a continuation commutation pass.

* * * * *